United States Patent
Tremblay et al.

(10) Patent No.: US 10,691,006 B2
(45) Date of Patent: Jun. 23, 2020

(54) METHODS AND SYSTEMS OF VIBRATING A SCREEN

(71) Applicant: IMAX Theatres International Limited, Dublin (IE)

(72) Inventors: Denis Gilles Tremblay, Brampton (CA); Gashtaseb Ariana, Oakville (CA)

(73) Assignee: IMAX Theatres International Limited, Dublin (IE)

(*) Notice: Subject to any disclaimer, the term of this patent is extended or adjusted under 35 U.S.C. 154(b) by 22 days.

(21) Appl. No.: 15/533,914

(22) PCT Filed: Dec. 8, 2015

(86) PCT No.: PCT/IB2015/059446
§ 371 (c)(1),
(2) Date: Jun. 7, 2017

(87) PCT Pub. No.: WO2016/092471
PCT Pub. Date: Jun. 16, 2016

(65) Prior Publication Data
US 2017/0363946 A1     Dec. 21, 2017

Related U.S. Application Data

(60) Provisional application No. 62/089,479, filed on Dec. 9, 2014.

(51) Int. Cl.
*G03B 21/56* (2006.01)
*G02B 27/48* (2006.01)

(52) U.S. Cl.
CPC ........... *G03B 21/562* (2013.01); *G02B 27/48* (2013.01)

(58) Field of Classification Search
CPC .................................................. G03B 21/562
(Continued)

(56) References Cited

U.S. PATENT DOCUMENTS

| 1,710,922 A | 4/1929 | De Forest |
| 1,817,630 A | 8/1931 | Kroesen |

(Continued)

FOREIGN PATENT DOCUMENTS

| CN | 1195463 | 10/1998 |
| CN | 1860411 | 11/2006 |

(Continued)

OTHER PUBLICATIONS

U.S. Appl. No. 15/949,101, "Non-Final Office Action", dated Apr. 2, 2019, 11 pages.

(Continued)

*Primary Examiner* — Christopher E Mahoney
(74) *Attorney, Agent, or Firm* — Kilpatrick Townsend & Stockton LLP

(57) ABSTRACT

A screen can be vibrated by vibrators that are drivable by signals. Each vibrator can be adjacent in position to other vibrators that are drivable by different types of drive signals than a drive signal associated with the vibrator. The number of drive signals can be equal to or less than the number of vibrators. A vibrator assembly for a vibrator can include a baffle and a transducer that couples to the baffle. The transducer can vibrate at least a portion of the screen. The vibrating screen can be monitored by a sensor and an analyzer unit that can analyze image speckle and screen displacement artifacts in captured images of images projected onto the screen and output results of the analysis.

37 Claims, 5 Drawing Sheets

(58) Field of Classification Search
USPC .......................................................... 359/446
See application file for complete search history.

(56) References Cited

U.S. PATENT DOCUMENTS

| | | | |
|---|---|---|---|
| 1,982,600 | A | 11/1934 | Sponable |
| 2,029,500 | A | 2/1936 | O'Brien |
| 2,348,818 | A | 5/1944 | Jacobson |
| 3,125,927 | A | 3/1964 | Erban |
| 3,610,728 | A | 10/1971 | Firth |
| 4,155,630 | A | 5/1979 | Ih |
| 4,317,618 | A | 3/1982 | Murakoshi et al. |
| 4,390,239 | A | 6/1983 | Huber |
| 6,122,023 | A | 9/2000 | Chen et al. |
| 6,317,169 | B1 | 11/2001 | Smith et al. |
| 7,593,159 | B2 | 9/2009 | Yokoyama et al. |
| 7,796,330 | B2 | 9/2010 | Sandburg et al. |
| 7,986,457 | B2 | 7/2011 | Kinoshita et al. |
| 8,724,218 | B2 | 5/2014 | Curtis et al. |
| 9,465,284 | B2 | 10/2016 | Tremblay et al. |
| 9,964,844 | B2 | 5/2018 | Herati et al. |
| 2002/0043561 | A1 | 4/2002 | Tsikos et al. |
| 2006/0238743 | A1 | 10/2006 | Lizotte et al. |
| 2007/0035826 | A1 | 2/2007 | Yokoyama et al. |
| 2008/0049315 | A1 | 2/2008 | Morikuni et al. |
| 2008/0117505 | A1 | 5/2008 | Sandburg |
| 2009/0009860 | A1 | 1/2009 | Marshall et al. |
| 2009/0141347 | A1 | 6/2009 | Mehrl et al. |
| 2009/0161980 | A1 | 6/2009 | Wang et al. |
| 2013/0010356 | A1 | 1/2013 | Curtis et al. |
| 2014/0063600 | A1 | 3/2014 | Sharp et al. |
| 2014/0071406 | A1 | 3/2014 | Manni et al. |
| 2014/0247484 | A1 | 9/2014 | Curtis et al. |
| 2014/0362437 | A1 | 12/2014 | Mcknight et al. |

FOREIGN PATENT DOCUMENTS

| | | |
|---|---|---|
| CN | 201654430 | 11/2010 |
| CN | 102109594 | 6/2011 |
| CN | 103048799 | 4/2013 |
| CN | 203894525 | 10/2014 |
| CN | 203894526 | 10/2014 |
| CN | 203894527 | 10/2014 |
| FR | 2981464 | 4/2013 |
| JP | 6077179 | 5/1985 |
| JP | 2004056261 | 2/2004 |
| JP | 2004193811 | 7/2004 |
| JP | 2005107150 | 4/2005 |
| JP | 2007298945 | 11/2007 |
| JP | 2008083687 | 4/2008 |
| JP | 2008191533 | 8/2008 |
| JP | 2010060745 | 3/2010 |
| JP | 2010107995 | 5/2010 |
| JP | 2012118231 | 6/2012 |
| KR | 20000061077 | 10/2000 |
| WO | 2011046035 | 4/2011 |
| WO | 2014167672 | 10/2014 |
| WO | 2014167673 | 10/2014 |
| WO | 2014181306 | 11/2014 |

OTHER PUBLICATIONS

Chinese Application No. CN201410199318.7 , "Notice of Decision to Grant", dated Mar. 20, 2019, 2 pages.
European Application No. EP15817557.0 , "Office Action", dated Feb. 18, 2019, 5 pages.
Goodman , "Speckle Phenomena in Optics: Theory and Applications", ISBN 0-9747077-9-1, Published by Roberts and Company, 2007, pp. 203-219.
Japanese Application No. JP2016-512471 , "Office Action", dated Apr. 9, 2019, 5 pages.
International Patent Application No. PCT/IB2015/059446, Invitation to Pay Additional Fees and Partial Search Report dated Mar. 7, 2016, 6 pages.
International Patent Application No. PCT/IB2015/059446, International Search Report and Written Opinion dated May 18, 2016, 17 pages.
U.S. Appl. No. 15/949,101 , "Corrected Notice of Allowability", dated Jan. 2, 2020, 2 pages.
U.S. Appl. No. 15/949,101 , "Notice of Allowance", dated Oct. 25, 2019, 6 pages.
Chinese Application No. CN201580067214.3, "Office Action", dated Jul. 2, 2019, 17 pages.
Japanese Application No. JP2017-530298, "Office Action", dated Dec. 10, 2019, 8 pages.
European Application No. EP18198991.4, "Office Action", dated Mar. 31, 2020, 4 pages.

METHODS AND SYSTEMS OF VIBRATING A SCREEN

CROSS-REFERENCE TO RELATED APPLICATION

This claims priority to U.S. Provisional Application No. 62/089,479, titled "Methods and Systems of Vibrating a Screen" and filed Dec. 9, 2014, the entire contents of which is incorporated herein by reference.

TECHNICAL FIELD

The present disclosure relates to enhancing a visual experience of viewing an image on a screen, and particularly (but not necessarily exclusively) to vibrating a screen on which an image is projected.

BACKGROUND

Shaking screens on which images are displayed can enhance displayed images on the screen. Viewers seated close to the screen may see screen surface-texture detail on specially formulated screens, which can provide optimal reflection of projected images. When loudspeakers are positioned behind the screen, the screen can be constructed with perforations to allow the sound from the loudspeakers to pass through the screen more effectively. Viewers seated close to a screen with perforations may see perforated edges. If a screen has a seam, the seam edge may become noticeable. By shaking the screen, screen artifacts that have edges can be blurred to make these features less visible or non-visible.

Projecting an image on a stationary screen using a coherent light source, such as a laser light source, can result in visual artifacts (known as speckle) in the image area. By shaking the screen surface on which an image is projected, speckle artifacts can be reduced or eliminated.

To ensure speckle or screen surface artifacts are reduced over all of the image area on the screen, all of the screen area can be shaken. It can be desirable to have more than one point or source of screen vibration to vibrate all of the image area of the screen. Screens can have a large surface area made of a material, such as vinyl, that absorbs sufficient vibration energy imparted to the screen such that the screen requires multiple vibration locations.

Using multiple vibrating sources to vibrate the screen, however, can introduce problems.

SUMMARY

In one example, a screen system includes a screen and vibrators. The vibrators can be positioned with respect to the screen for vibrating the screen. The vibrators can be separately driven by uncorrelated drive signals of different types. Each vibrator can be adjacent in position to other vibrators driven by different types of drive signals than a drive signal associated with the vibrator. The number of drive signals is equal to or less than the number of vibrators.

In another example, a screen vibrator assembly includes a baffle and a transducer for coupling to the baffle. The transducer can vibrate at least part of a screen. The screen vibrator assembly is positionable with other screen vibrator assemblies with respect to the screen and can be driven by a vibrator drive signal that is a different type that types of drive signals driving the other screen vibrator assemblies adjacent to the screen vibrator assembly.

In another example, a method is provided. A vibrator among multiple vibrators that vibrate a screen is driven using a first type of drive signal. The other vibrators that are adjacent in position to the vibrator are driven using different types of drive signals than the first type of drive signal.

In another example, a method is provided. An image is displayed onto a screen to evaluate speckle and visual screen displacement artifacts. The image displayed onto the screen is captured using an image sensor. A first vibration setting for a vibrator is determined by analyzing the image captured by the image sensor for speckle artifacts and visual screen displacement artifacts. The vibrator is adjusted using the first vibration setting. A second image displayed onto the screen is captured using the image sensor. Whether the speckle artifacts and visual screen displacement artifacts are within a predetermined acceptable amount is determined. In another example, a vibrating screen-monitoring system includes a sensor and an analyzer unit. The sensor can be positioned for capturing an image with screen-displacement artifacts in response to an input that indicates when to capture the image. The analyzer unit can store a captured image from the sensor. The analyzer unit can analyze the screen displacement artifacts in the captured image for determining a functional status of a screen vibrator system that includes a vibrators positioned to vibrate the screen. The analyzer unit can set a flag in response to determining the functional status of the screen vibrator system.

DETAILED DESCRIPTION

Certain aspects and features relate to a screen vibration system that can vibrate a theatre screen using acoustical, electromagnetic, or another type of energy, while reducing the presence of screen surface texture features, or screen edge artifacts (e.g., edges of perforation holes and seams) or screen image artifacts (e.g., speckle), that may otherwise be visible if it were not for vibrating the screen. Artifacts that can be reduced by screen vibration may be referred to as the targeted artifacts.

Screens, supported by a screen support structure, can have a mass of a couple hundred or more kilograms. One approach to shaking the screen is to distribute the vibrating assemblies over the area of the screen and to apply a limited amount of energy to each of the vibrating assemblies to collectively shake the whole screen.

Providing a screen-shaking system with screen vibrators distributed across the screen can be costly. Keeping costs down involves keeping the number of screen vibrators and controllers to a minimum, while ensuring an appropriate reduction in the targeted artifacts.

Figure 1:
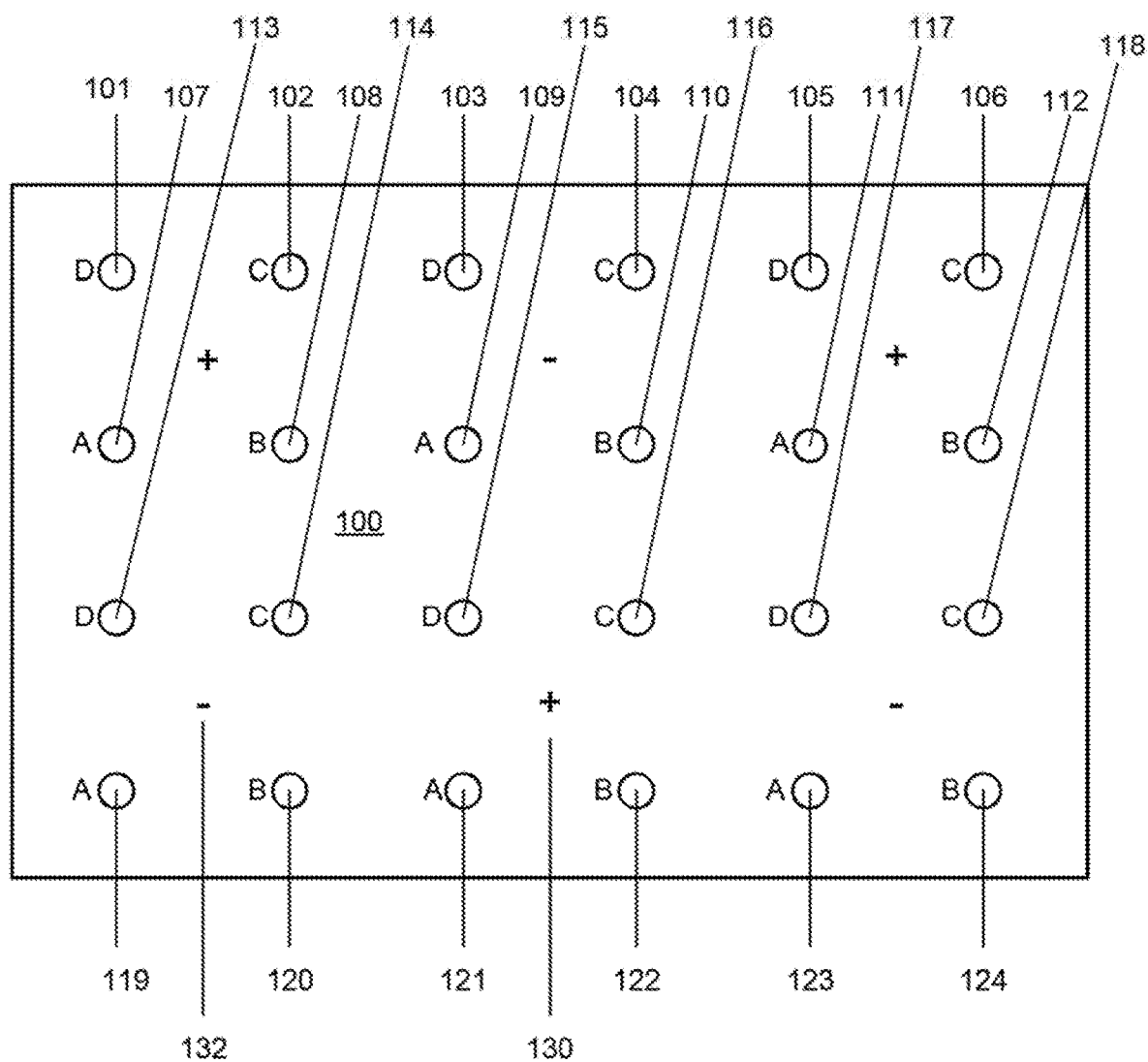
FIG. 1 is a front view of a screen with screen vibration sources according to one example of the present disclosure.

FIG. 1 is a front view of a screen 100 that indicates the location and distribution of vibrating sources behind the screen. The screen 100 in this example shows vibrating sources 101-124 that are vibrators. The vibrating sources 101-124 are located away from any edge of the screen 100 to prevent waves from being absorbed and reflected at the boundaries of the screen 100. Vibration energy that is absorbed is energy that has been coupled to the screen 100 but because it is absorbed this energy is effectively wasted energy that is not desirable. Energy that is reflected by the screen-edge-support structure can cause undesirable screen vibration interactions that can lead to standing-wave conditions that are less effective at removing the targeted artifacts.

The vibrating sources 101-124 can be mounted to the screen frame that supports the screen 100. Screens that are very large can be supported by a stand-alone screen support structure that is mounted to the floor of the theatre auditorium.

One approach to help reduce costs of the screen vibration system is to minimize the number of separate drive sources with drive signals that are de-correlated (also referred to as uncorrelated) from each other to minimize standing waves of screen vibration between vibrating sources. FIG. 1 shows at each of the vibration locations the letter reference designation (labeled A, B, C, D) of four different, de-correlated signals provided to cause the vibrating sources 101-124 to vibrate.

The vibrating sources 101-124 are not adjacent to another vibrating source driven with the same drive signal. Configuring each of the de-correlated drive signals to each of the vibrating sources 101-124 as shown in FIG. 1 can minimize the number of de-correlated drive signal sources to four. Different numbers of drive signals can be used. For example, the number of different de-correlated drive sources can be greater than four. For larger screens, the number of vibrating assemblies can be increased and configured as described for FIG. 1.

In some examples of the screen-vibrator configuration in FIG. 1, each vibrating source is surrounded by vibrating sources driven with a different de-correlated drive signal to avoid standing waves from occurring between vibrating sources.

In another example, the vibrating sources behind the screen can be configured in groupings that include different de-correlated drive signals such that the groupings of vibrating sources are configured with either a positive or negative polarity. For example, FIG. 1 shows a group of vibrating sources 115, 116, 121, 122 associated with a drive polarity that is positive (+) 130 and an adjacent group of vibrating sources 113, 114, 119, 120 that are driven with a drive polarity that is negative (−) 132. The polarity can depend on the connection terminals, which may be associated and marked for a particular polarity, of the drive signal sources that are electrically connected to connection terminals of the vibrating sources. For example a vibrating source can receive a drive signal through two electrical connection terminals of which one can be marked with a polarity indication or both can be marked with their own polarity indication. The drive signal source can have a pair of output electrical connection terminals that also have a polarity indication. Electrically connecting each of the two driver-signal-source connection terminals to each of the two vibrating-source connection terminals can result in two different connection possibilities with respect to the connection terminal polarity markings. By stating which polarity-marked terminals of the vibrating source are electrically connected to which polarity-marked terminals of the driver signal source, the condition defining a positive (+) polarity connection and a negative (−) connection can be identified, set up, and controlled.

FIG. 1 indicates the polarity of the drive signal to each group of vibrating sources where a group refers to vibrating sources that are adjacent to each other and have a different drive signal A, B, C, and D and that are configured to be the same polarity. Distributing vibrator polarity may result in cancellation of the compression waves from the vibrating sources in spaces further away from the screen where the audience can be positioned to minimize audible noise from the screen vibration system being perceived by a patron in a theatre seat viewing the screen 100.

Figure 2:
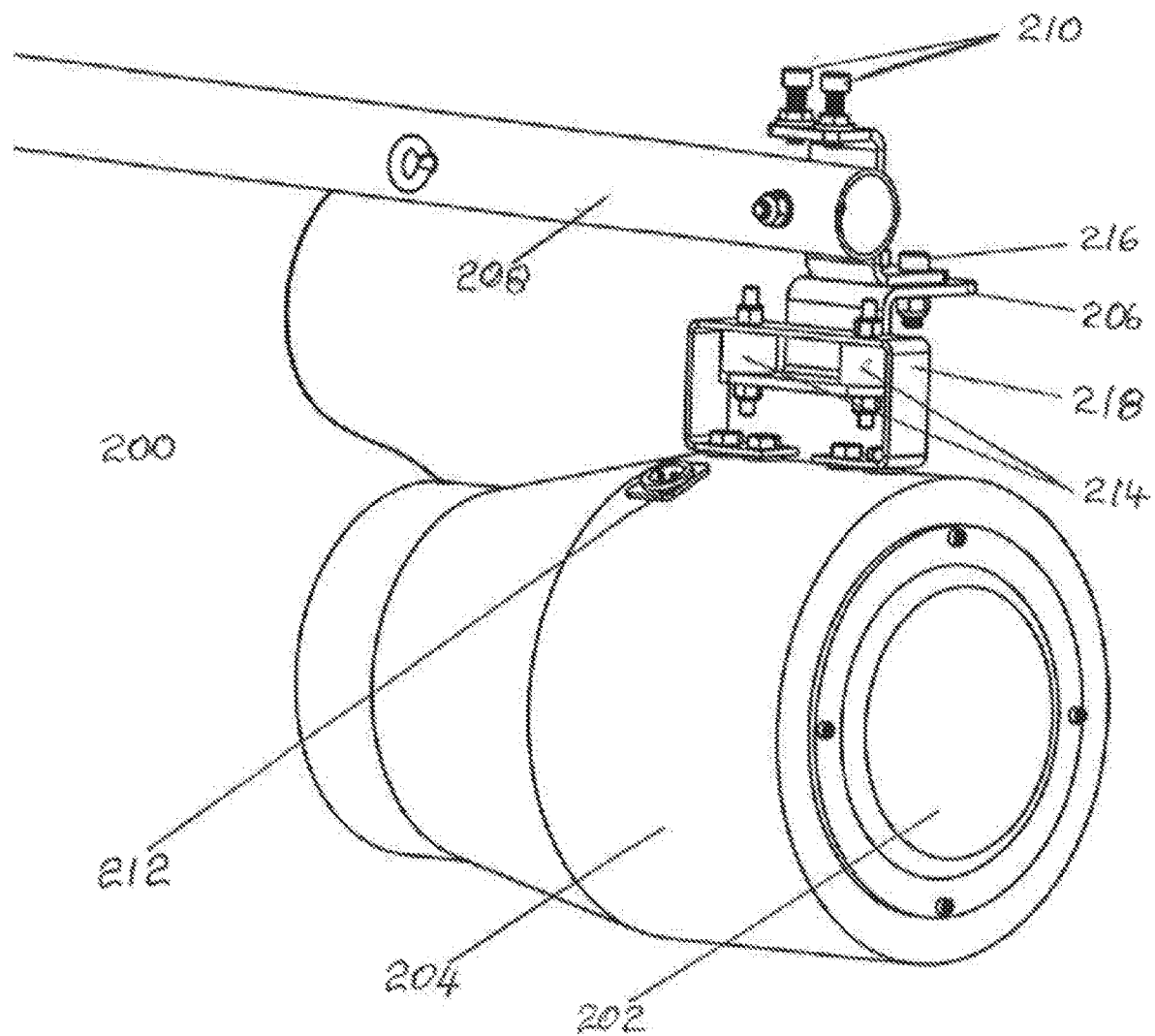
FIG. 2 is a perspective view of an acoustical vibrator with a baffle and an isolation mount according to one example of the present disclosure.

To acoustically vibrate the screen 100, an assembly of acoustical vibrating sources 101-124 may be constructed to allow efficient coupling via the air between an acoustical transducer and the back surface of the screen 100. FIG. 2 illustrates a vibrating source that is an acoustical vibrator assembly 200 that can be positioned behind the screen and front face of the vibrator 202 can be positioned within inches or fractions of an inch of the back surface of the screen. The vibrator 202 in the acoustical vibrator assembly 200 is located at the front of a baffle housing 204 for a baffle that is cylindrical. The back end, opposite the end of the baffle housing of the vibrator assembly 200 where the vibrator 202 is positioned, can be tuned with a cylindrical taper at the back end of the baffle towards an opening. The vibrator 202 can be an electromechanical acoustical transducer assembly that converts electrical energy into acoustical energy. The vibrator 202 can be driven or powered with an electrical signal via an electrical connection 212. A mount 218 on the baffle housing 204 with the vibrator 202 can be attached via a vibration isolation device 214 to a mounting bracket 206. The vibration isolation device 214 can isolate from the mounting bracket 206 the vibrations caused by the vibrator 202. The mounting bracket 206 can allow the vibration assembly 200 to be mounted to the screen frame or other fixed structure so that the vibrating assembly 200 can be properly positioned near the screen. The isolation devices 214 can provide shear and compression isolation to isolate the vibration of the baffle with the vibrator 202 from the mounting bracket 206. In FIG. 2, a vibration mounting bracket 206 is mounted to a pipe 208. The pipe 208 can be attached to a fixed structure, such as a screen-support frame structure (not shown). The position of the vibration assembly 200 from the backside surface of the screen can be adjusted, for example by extending or retracting the pipe 208 where it is mounted to the fixed structure. The tilt alignment of the vibration assembly 200 with respect to the screen surface can be adjusted by tilt-angling screws 210. A yaw alignment of the vibration assembly 200 with respect to the screen surface can be adjusted by a yaw-angling screw 216.

The baffle housing 204 can be designed with a shape that allows the air between the vibrator 202 and the screen (not shown) to efficiently displace the screen. One way to displace the screen is to configure the baffle housing 204 to create a directive, cardioid-shaped, air-displacement-dispersion pattern at the frequencies at which the vibrator 202 is actuated. An example of the frequency range in which the vibrator 202 is actuated is 10 Hz to 35 Hz.

The screen can experience shifting over time, which may result in screen sag. The distance of the vibration assembly 200 from the backside of the screen may be re-adjusted accordingly. The distance of the vibration assembly 200 to the screen can be adjusted using with a motorized mechanism and a feedback-sensing device.

Another problem can occur if the properties of the screen material change with temperature and humidity. Using a screen material such as vinyl that becomes stiffer as the temperature decreases can cause the screen vibration characteristics to change as well. The screen material may absorb moisture, which can cause a greater amount of screen sag. Sag can also cause the vibration characteristics of the screen to change, as well as the position of the screen with respect to the vibration assembly 200.

One approach with a laser projection system where speckle artifacts can appear on the screen is to monitor the speckle artifacts with a feedback system that includes a camera and an analyzer to detect where on the screen that speckle is occurring. Areas of the screen with speckle or an unacceptable amount of speckle can have the amount of vibration displacement increased by increasing the vibration drive signal level to the vibration assembly 200 in the vicinity where the speckle is occurring. Another approach is to reduce the distance between the screen and the vibration assembly 200 to increase the amount of screen vibration displacement when there is sufficient distance to do so between the screen and the vibration assembly 200.

Another approach is to monitor the displacement of the screen with a screen-displacement-monitoring device at or near the location of the vibration assembly 200. The distance of the vibration assembly 200 to the screen can be changed or the magnitude of the drive signal to the vibration assembly 200 can be changed to keep the screen-vibration displacement constant. A device to measure screen displacement can be an infrared (IR) range-finder device or an optical range-finder device.

Another approach can be to monitor auditorium temperature or humidity and compensate for the change in temperature or humidity by adjusting the magnitude of the screen vibration drive signal. Where screens are very high (e.g., approximately 10 meters to 20 meters in height), the temperature at the top quarter of the screen may be different than the temperature at the bottom quarter of the screen by, for example, five degrees Celsius. The drive signal to the upper vibration assemblies may be compensated differently than the drive signal to the lower vibration assemblies in this situation or the vibration assemblies can be repositioned differently with respect to the screen.

Figure 3:
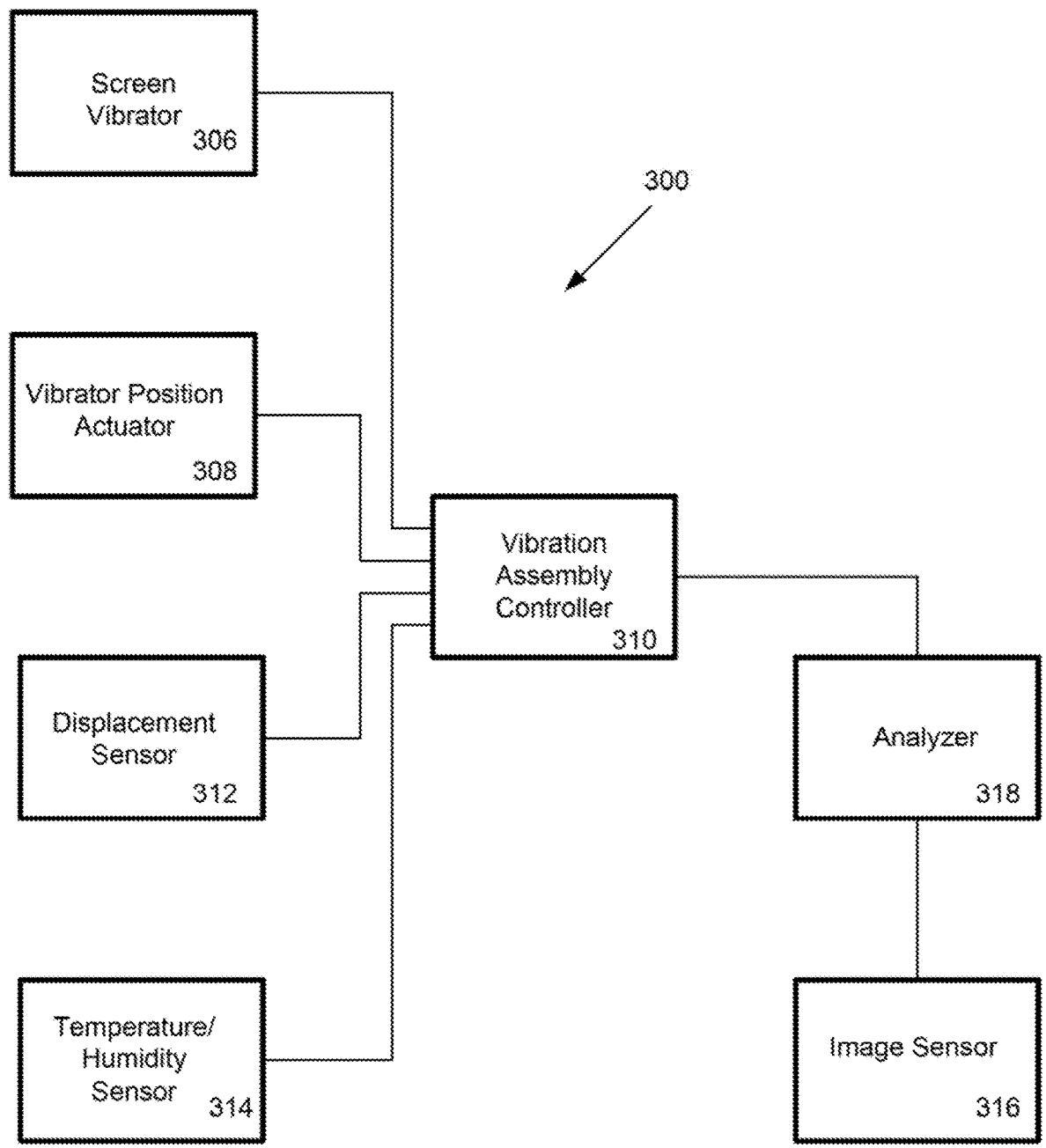
FIG. 3 is a block diagram of a vibrator assembly and a controller with feedback to overcome change in screen vibration displacement over time according to one example of the present disclosure.

FIG. 3 is a block diagram of a system 300 for vibrating a screen. The system 300 can be, at least partially positioned behind a screen. For example, there may be multiple vibrator assemblies positioned behind the screen at various locations. A screen vibrator 306 is shown in the system 300, by way of example. The vibrator 306 can be a transducer assembly that allows vibration energy from the transducer assembly to be coupled to the screen to cause the screen to vibrate. The system also includes a vibrator position actuator 308 that may be a motorized assembly that can change the position of the screen vibrator 306 with respect to the system.

The system 300 can include a vibration assembly controller 310 that can control the vibrator position actuator 308 and the drive signal to the vibrator 306. The vibration assembly controller 310 can be an electronic controller that sends electrical drive signals to the vibrator 306 and the vibrator position actuator 308. The vibration assembly controller 310 can receive information from a displacement sensor 312 that is positioned to indicate the distance between the vibrator 306 and the screen. The vibration assembly controller 310 can also receive screen-vibration displacement information from the displacement sensor 312. An example of the displacement sensor 312 is a range finder sensor, such as an IR range finder sensor or an optical range finder sensor. Since the screen vibration is low frequency, the displacement sensor 312 may only need to have a corresponding response capability. Using information about screen-vibrator displacement, the vibration assembly controller 310 can regulate the amount of displacement of the screen vibration if the screen-vibration displacement changes over time.

In some examples, temperature or humidity information that can have an influence on screen vibration displacement can be detected. For example, the system 300 can include a temperature or humidity sensor 314 that can provide temperature or humidity information to the vibration assembly controller 310. The vibration assembly controller 310 can use the information to determine the corresponding change in screen-vibration displacement and instruct the vibrator position actuator 308 accordingly.

In some examples, an image sensor 316, such as a camera directed at the screen image, can capture an image from the screen. An analyzer 318 can be communicatively coupled to the image sensor 316 to receive information about the image. The analyzer 318 can analyze the information to determine where speckle is occurring on the screen. The analyzer 318 can communicate the results of the analysis to the vibration assembly controller 310, which can cause an amount of compensation to be applied to the vibrator 306 or reposition the vibrator 306 with respect to the screen to change the screen vibration displacement and decrease the speckle.

The analyzer 318 may be a unit with a microprocessor programmed to do speckle analysis on captured images to determine the amount of speckle in an image and recognize where in the image the speckle needs to be reduced. The analyzer 318 can also be a control unit that can communicate with the vibration assemblies so that compensation information may be directed to an appropriate vibration assembly controller, if multiple controllers are available. The analyzer 318 can alternatively be a separate processor unit that communicates with a separate controller unit to communicate with each vibrator assembly control unit.

Figure 4:
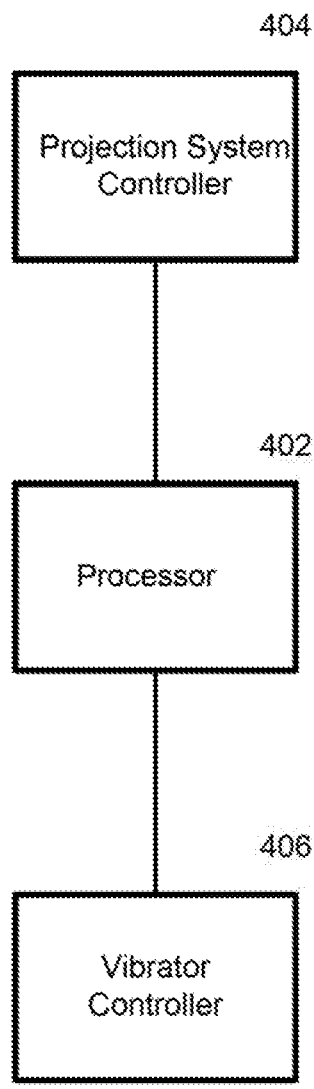
FIG. 4 is a block diagram of a system to adjust screen vibration based on image content according to one example of the present disclosure.

FIG. 4 is a block diagram of another example of a screen vibration control system. The system of FIG. 4 can configure screen-vibrator displacement based on image content. Speckle or screen texture artifacts can be more noticeable with uniform minimal texture scenes, such as blue sky, white clouds, or snow scenes. In these uniform scenes with minimal texture, the screen-vibration displacement can be increased. The screen-vibration displacement can be reduced in the screen areas where there is much image detail or black. The system in FIG. 4 can include a processor 402, a projection system controller 404, and a vibration assembly controller 406. The processor 402 may be programmed by a user or by inputting meta-data from image content to determine when to communicate to the vibration assembly controller 406 to increase or decrease the screen-vibration displacement at particular moments and locations for a series of image scenes. The processor 402 may interface with the projection system controller 404 to synchronize the changes of the vibration in various areas of the screen with the images being projected. The vibration assembly controller 406 can change the distance between a vibrator and a screen accordingly or change the amount of vibration drive signal to the vibrator.

A projection screen system with a screen-vibrating assembly can cause the screen to be an active screen system rather than a static screen surface for displaying projected images. A screen that is vibrated may be tuned to maximize the viewing quality of the projected image on the screen. The amount of vibration may depend on how much the visual artifacts, such as speckle or screen texture edges, can be suppressed without creating additional visual artifacts resulting from screen displacement during vibration. A screen can be over-displaced during vibration such that the over-displacement can be noticed by a viewer, such has a viewer seated close to the screen, as an appearance-altering effect (e.g., visible screen movement) on viewed image content, which may be considered undesirable. The screen can be tuned such that the vibrators are set to create screen displacement that removes the intended visual artifacts without causing additional unintended visual artifacts to become apparent.

Figure 5:
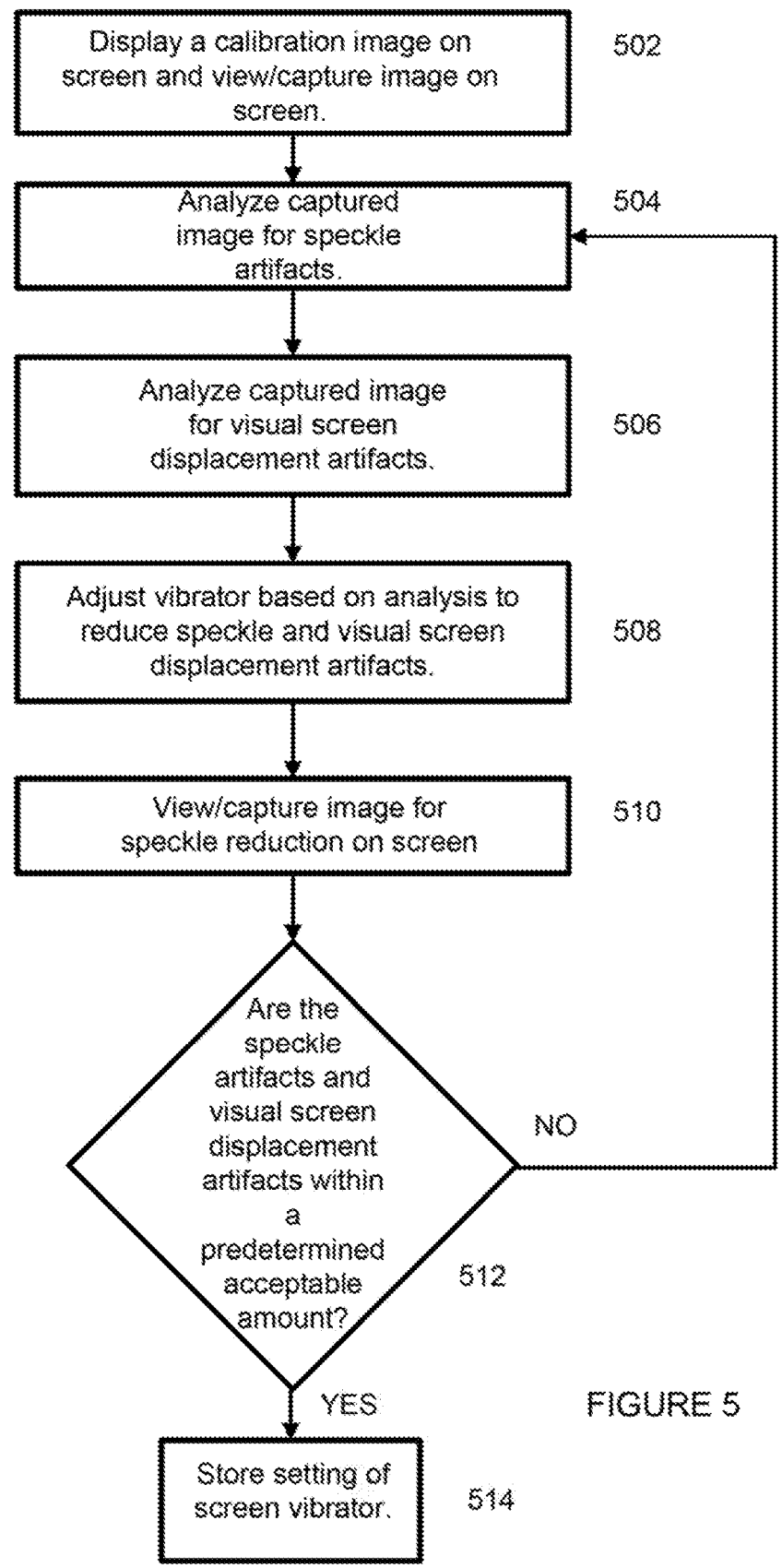
FIG. 5 is a flowchart of a process to tune screen with vibrators according to one example of the present disclosure.

FIG. 5 depicts an example of a process for tuning a screen to reduce image speckle from a laser projection system according to some aspects. Tuning a screen can include determining a setting, such as determining the amount of drive signal to apply to a vibrator or determining a positon of a vibrator from the screen or both to reduce speckle. FIG. 5 is described with reference to the system 300 in FIG. 3, but other implementations are also possible.

In block 502, a calibration image is displayed on the screen and the image from the displayed image is viewed or captured by the image sensor 316. The calibration image may be one that is susceptible to speckle such that the light is uniform across the screen. For example, green laser light can be more susceptible to speckle than red and blue laser sourced light and the green laser light may be used to set the vibration level of a screen vibrator in tuning the screen.

Speckle can be more apparent with screens that have a reflective gain coating. The reflective gain coating may not have uniform reflective properties across the screen and some areas may require a different setting of screen vibration than other areas to reduce speckle by the same amount. Tuning the screen can be performed by setting each screen vibrator separately, which can also address screen-coating-gain-uniformity variations that can influence speckle by different amounts.

In block 504, captured images are analyzed by the analyzer 318 for speckle articles. By analyzing the captured image, a vibration setting can be determined for a screen vibrator to reduce speckle. The analyzer 318 can store the captured image from the image sensor 316 and can include image speckle analyzing software that can analyze the captured image for image speckle. The analyzer 318 can provide the vibration assembly controller 310 with the vibration setting information to reduce speckle to within acceptable limits.

In block 506, the captured image is also analyzed for visual screen-displacement artifacts. The analyzer 318 can store the captured image and can include screen displacement artifact analyzing software to analyze the captured image and determine if visual screen displacement artifacts are within acceptable limits. In other examples, a subsequent image that is different than the previous image can be projected, viewed, or captured to determine if any of the vibration levels are causing unacceptable visual screen displacement artifacts to appear.

In block 508, a vibrator can be adjusted based on the analysis to reduce speckle and visual screen-displacement artifacts. Where visual screen displacement artifacts are determined to be unacceptable, the analyzer 318 can reduce and update a setting of a vibrator to reduce the visual screen displacement artifact. For example, an area that has unacceptable screen displacement artifacts can have the vibration setting adjusted.

In block 510, an image on the screen is viewed or captured again by the image sensor 316. For example, when the analyzer 318 has determined the vibrator settings for speckle reduction, the analyzer 318 can cause the subsequent tuning image to appear on the screen to determine if visual screen displacement artifacts are within acceptable limits. The subsequent image can be the same image used for speckle reduction, or a different image or no image at all. The image sensor 316 can capture the light image from the screen for determining visual screen displacement artifacts.

In block 512, a system determines whether the speckle artifacts and visual screen displacement artifacts are within a predetermined acceptable amount. If the speckle artifact or the visual screen displacement artifact is not within a predetermined acceptable amount, the process can return to block 504 to repeat analyzing for speckle artifacts and visual screen displacement artifacts and adjusting the vibrator setting. The analyzer 318 can repeat the tuning process for reducing speckle and for keeping visual screen displacement artifacts at reduced levels to determine the vibrator setting with the best compromise as dictated by a pre-established criterion provided to the analyzer. If the speckle artifacts and visual screen disturbance artifacts are within predetermined limits, the setting of the screen vibrator can be stored for future use in block 514. The process of capturing, storing, and analyzing the captured image can be iterative until speckle is reduced to acceptable limits. Settings for the vibration assembly controller 310 can be stored in a memory of the analyzer 318. The analyzer 318 can communicate with the projector (not shown) to coordinate projecting the needed tuning light image onto the screen.

An alternate approach that in some cases be easier to manage screen vibration can include setting a portion or all of the vibrators to a maximum setting that is just below the setting that visual screen displacement artifacts are visible.

Tuning the screen can alternatively be performed manually by a trained person making the determination of the best screen vibrator setting to reduce speckle and minimize visual screen vibration displacement artifacts.

In another example, the system 300 in FIG. 3 can be configured such that the vibrators are monitored for functionality. Screen vibrators can experience wear and failure because the transducers within are devices with moving parts. Other failures can include the drives that provide the signal to the vibrating sources failing to operate properly. Large screens can be fitted with many vibrating sources. If a vibrator fails, the reduction of speckle may not occur in the area approximate with the failed vibrator. By monitoring the screen vibrator sources over time, any vibrators that fail may be identified and the condition flagged to a location that initiates further action to overcome the screen vibrator problem. The flagged condition may be queried by an automated system or by a remote system, a service person, or theatre system operator.

To implement a screen-monitoring system, in particular for a screen with screen vibrator sources, the system described in FIG. 3 can be used. The image sensor 316 can capture a view of the screen with or without a projected screen image on the screen and cause the captured camera image to be stored, such in memory in the analyzer 318 that has a processor capable of analyzing the captured image for visual screen disturbance artifacts. During the time that the camera is capturing the screen image, the vibrator 306 in the screen-vibrating source can be commanded or controlled. The screen vibrators can be commanded to ensure that the screen vibrators cause a visual screen disturbance artifact to occur on the screen so that the captured image can be analyzed to confirm there is a visual screen disturbance artifact at each vibrator location and conclude that each vibrator is functioning. A vibrator location behind the screen that does not cause a visual screen disturbance artifact to appear on the screen can be detected by the analysis performed by the analyzer 318 and may be flagged as requiring further attention by a person to correct the vibrator assembly problem. Capturing the screen image by the image sensor 316 during vibrator assembly functional verification may be coordinated, for example by the analyzer 318, so the screen vibrators are commanded to the vibration setting to obtain the visual screen disturbance artifact needed. Other processor units, such as a projector control console that controls the projection system, with a microprocessor can coordinate the screen monitoring system.

An alternate approach to determining a failure in a screen vibrating assembly may include analyzing the signal from the screen vibration displacement sensor to determine whether the signature of the signal is indicating a failed vibrator when a vibration controller applies a known drive signal to the vibration transducer. For example, a condition can be flagged to initiate further action when a screen disturbance displacement signal is absent from the displacement sensor 312. For example, the signal from the displacement sensor 312 can be stored in the memory of the vibration assembly controller 310. The processor in the vibration assembly controller 310 can execute a program to analyze the displacement signature characteristics of the stored signal to determine whether the signature of the signal from the screen vibration displacement sensor indicates a failed vibrator.

Another approach may involve the vibration assembly controller 310 monitoring the electrical current of the drive signal to the vibration transducer for proper operation. The electrical current of the resulting drive signal to the vibration transducer can have a signature that has a characteristic of nominal performance of the vibration transducer and loading on the vibration transducer. A vibration transducer that does not function nominally can have a different-than-expected signature because of a transducer failure that is reflected in the resulting electrical current when a known transducer drive signal is applied to the transducer. When there is a not nominal resulting electrical current to the vibration transducer with the applied transducer drive signal, the condition can be flagged to initiate further action. For example, the signal from the vibration transducer electrical current sensor can be stored in the memory of the vibration assembly controller 310. The processor in the vibration assembly controller 310 can execute a program to analyze the stored signal to determine whether the signature of the signal is indicating a failed vibrator. An example of a condition that is flagged can include where the resulting electrical current by the vibration transducer is too low or constant over time when a known drive signal to cause vibration to occur is applied.

In another example, a standalone screen monitoring system can be set up. The standalone screen monitoring system can monitor the screen vibrator sources and not be a part of the screen vibration system. For example, the standalone unit can contain an image sensor such as a camera and an analyzer with memory and a processor. The standalone unit can store in memory a screen image captured by the camera and perform an analysis using software that is executable by the processor to detect visual screen disturbances caused by a vibrator with the stored image to confirm a screen vibrator is fully functional. The captured image can be analyzed to determine locations of visual screen displacement artifacts and flag screen locations where any absent screen displacement artifacts appear in place of where a screen displacement artifact was expected. Via a communication interface on the standalone unit, the functional status of the screen vibration system can be determined. The standalone unit can be configured to communicate a command to the vibration system to cause the screen vibrator source to vibrate for the functional evaluation of the vibrator. The standalone unit can also be configured with an interface to receive from an automated system, such as a theatre automation system or from a projection system control console, an indication of when to capture or to synchronize capturing an image of the screen with screen displacement artifacts or when the screen vibrating sources are being commanded to vibrate for functional evaluation. The standalone unit can subsequently determine if a vibrator source has failed as well as which vibrating source and flag the condition to others in ways disclosed earlier to initiate corrective action.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A vibrating screen-monitoring system, comprising:
a sensor positionable for sensing vibration of a screen indirectly by capturing a signal with a signature that is characteristic of a vibrator in response to a drive signal to the vibrator; and
an analyzer unit configured to store the signature from the sensor, to analyze the signature for determining a functional status of the vibrator in a screen vibrator system that includes a plurality of vibrators positioned to vibrate the screen, and to set a flag in response to determining the functional status of the vibrator in the screen vibrator system.

2. The vibrating screen-monitoring system of claim 1, wherein the plurality of vibrators are separately drivable by uncorrelated drive signals of different types, each vibrator of the plurality of vibrators being adjacent in position to other vibrators drivable by different types of drive signals than a drive signal associated with the vibrator.

3. The vibrating screen-monitoring system of claim 1, wherein the signature is electrical current to the vibrator in response to a known drive signal applied to the vibrator.

4. The vibrating screen-monitoring system of claim 1, wherein the signature is a displacement of the vibrator in response to a known drive signal applied to the vibrator.

5. The vibrating screen-monitoring system of claim 1, wherein the signature is an image of the screen in response to a known drive signal applied to the vibrator.

6. The vibrating screen-monitoring system of claim 5, wherein the analyzer unit is configured to determine that the image of the screen includes speckle artifacts,
wherein the vibrating screen-monitoring system is configured to flag a failed vibrator or a failed vibrator source in response to determining that the image of the screen includes speckle artifacts.

7. The vibrating screen-monitoring system of claim 5, wherein the sensor is configured to capture the image of the screen in response to an input that indicates when to capture the image, the image having screen displacement artifacts.

8. The vibrating screen-monitoring system of claim 7, wherein the analyzer unit is configured to analyze the signature for screen displacement artifacts for determining a functional status of the vibrator.

9. The vibrating screen-monitoring system of claim 8, wherein the vibrator is controllable to cause the screen displacement artifacts to appear on the screen.

10. The vibrating screen-monitoring system of claim 1, wherein the flag is configured to indicate a failed vibrator or a failed vibrator drive.

11. The vibrating screen-monitoring system of claim 1, wherein the flag is configured to be queried by an automated system, a remote system, a service person, or a theatre system operator.

12. The vibrating screen-monitoring system of claim 11, wherein the vibrating screen-monitoring system is configured to communicate a command to the screen vibrator system to cause a screen vibrator source to vibrate for a functional evaluation of the vibrator.

13. The vibrating screen-monitoring system of claim 1, wherein the vibrating screen-monitoring system is a stand-alone system that is independent of the screen vibrator system.

14. An analyzer unit for a vibrating screen-monitoring system, the analyzer unit comprising:
a processor device configured to cause the analyzer unit to:
sense vibration of a screen indirectly by receiving, from a sensor, a signature that is characteristic of a vibrator in response to a drive signal to the vibrator;
store the signature;
determine a functional status of the vibrator in a screen vibrator system that includes a plurality of vibrators positionable to vibrate the screen; and
set a flag in response to determining the functional status of the vibrator in the screen vibrator system.

15. The analyzer unit of claim 14, wherein the plurality of vibrators are separately drivable by uncorrelated drive signals of different types, each vibrator of the plurality of vibrators being adjacent in position to other vibrators drivable by different types of drive signals than a drive signal associated with the vibrator.

16. The analyzer unit of claim 14, wherein the signature is electrical current provided to the vibrator in response to a known drive signal applied to the vibrator.

17. The analyzer unit of claim 14, wherein the signature is a displacement of the vibrator in response to a known drive signal applied to the vibrator.

18. The analyzer unit of claim 14, wherein the signature is an image of the screen captured by the sensor in response to a known drive signal applied to the vibrator.

19. The analyzer unit of claim 18, wherein the analyzer unit is configured to flag a failed vibrator or a failed vibrator source in response to determining that the image of the screen includes speckle artifacts.

20. The analyzer unit of claim 18, wherein the analyzer unit is configured to receive, from the sensor, the image of the screen captured by the sensor in response to an input that indicates when to capture the image, the image having screen displacement artifacts.

21. The analyzer unit of claim 20, wherein the analyzer unit is configured to analyze the signature for screen displacement artifacts for determining a functional status of the vibrator.

22. The analyzer unit of claim 21, wherein the analyzer unit is configured to control the vibrator to cause the screen displacement artifacts to appear on the screen.

23. The analyzer unit of claim 14, wherein the flag is configured to indicate a failed vibrator or a failed vibrator drive.

24. The analyzer unit of claim 14, wherein the flag is configured to be queried by an automated system, a remote system, a service person, or a theatre system operator.

25. The analyzer unit of claim 24, wherein the vibrating screen-monitoring system is configured to communicate a command to the screen vibrator system to cause a screen vibrator source to vibrate for a functional evaluation of the vibrator.

26. The analyzer unit of claim 14, wherein the vibrating screen-monitoring system is a stand-alone system that is independent of the screen vibrator system.

27. A method comprising:
sensing vibration of a screen indirectly by capturing, using a sensor, a signal with a signature that is characteristic of a vibrator in response to a drive signal to the vibrator;
storing, by an analyzer unit, the signature from the sensor;
determining, by the analyzer unit analyzing the signature, a functional status of the vibrator in a screen vibrator system that includes a plurality of vibrators positioned to vibrate the screen; and
setting a flag in response to determining the functional status of the vibrator in the screen vibrator system.

28. The method of claim 27, further comprising:
separately driving, by uncorrelated drive signals of differently types, each vibrator of the plurality of vibrators being adjacent in position to other vibrators driven by different types of drive signals than a drive signal associated with the vibrator.

29. The method of claim 27, wherein the signature is electrical current to the vibrator in response to a known drive signal applied to the vibrator.

30. The method of claim 27, wherein the signature is a displacement of the vibrator in response to a known drive signal applied to the vibrator.

31. The method of claim 27, wherein the signature is an image of the screen in response to a known drive signal applied to the vibrator.

32. The method of claim 31, further comprising:
flagging a failed vibrator or a failed vibrator source in response to determining that the image of the screen includes speckle artifacts.

33. The method of claim 31, wherein capturing the image of the screen includes capturing the image of the screen in response to an input that indicates when to capture the image, the image having screen displacement artifacts.

34. The method of claim 33, further comprising:
analyzing, by the analyzer unit, the signature for screen displacement artifacts for determining a functional status of the vibrator.

35. The method of claim 34, further comprising:
controlling the vibrator to cause the screen displacement artifacts to appear on the screen.

36. The method of claim 27, further comprising:
indicating, by the flag, a failed vibrator or a failed vibrator drive.

37. The method of claim 27, further comprising:
communicating a command to the screen vibrator system to cause a screen vibrator source to vibrate for a functional evaluation of the vibrator.

* * * * *